United States Patent Office 2,852,698
Patented Sept. 16, 1958

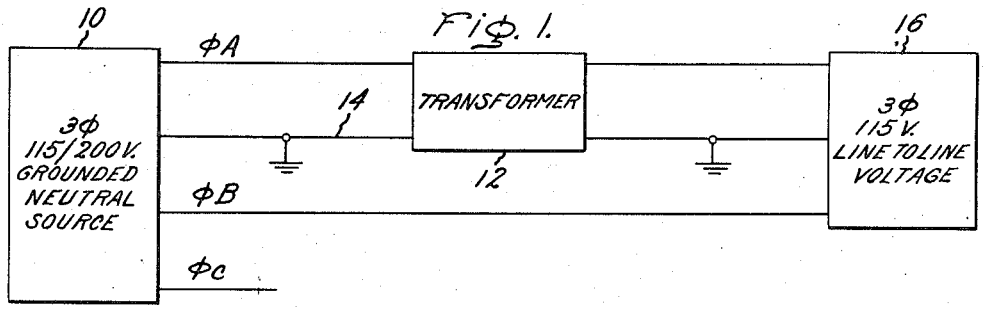
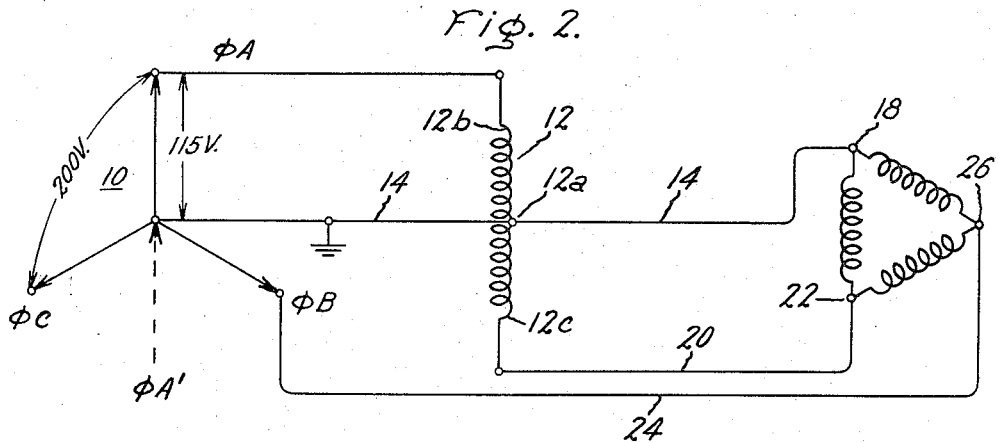
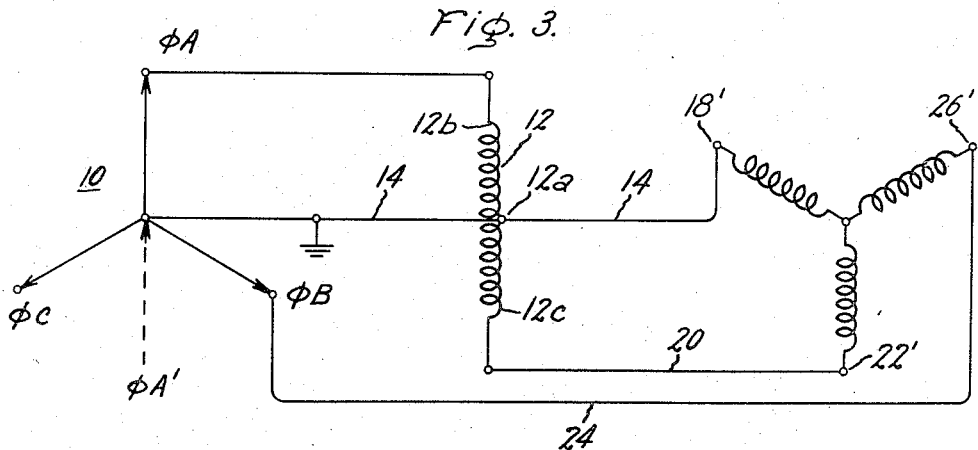

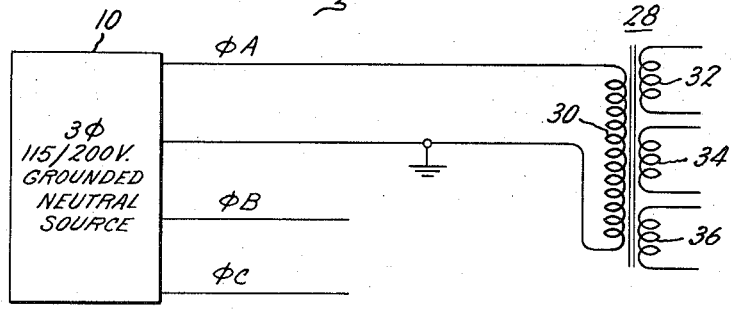
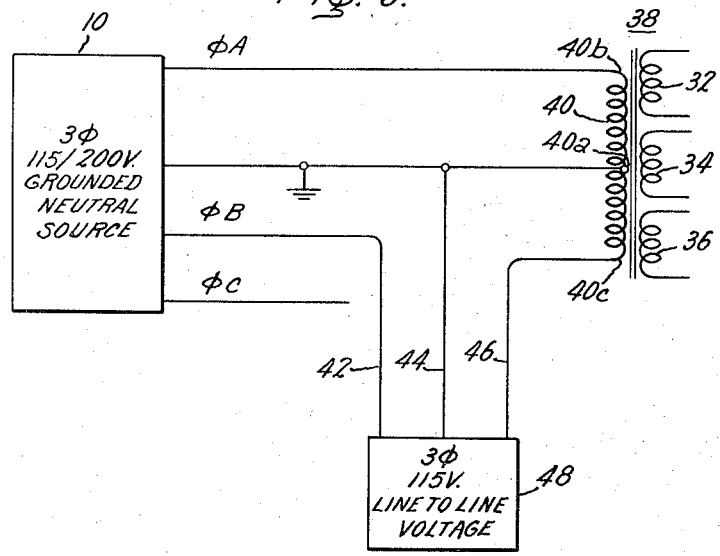

2,852,698

THREE-PHASE VOLTAGE SOURCE CONVERTER

Raymond J. Twardzik, Scotia, and Harold H. P. Lemmerman, Schenectady, N. Y., assignors to General Electric Company, a corporation of New York Application May 14, 1956, Serial No. 584,527

5 Claims. (Cl. 307—17)

This invention relates to means for converting a three-phase voltage source to a supply of three-phase power at a lower voltage, and more particularly to the use of a single transformer to convert a three-phase source of electric power to a three-phase voltage supply of lower potential without greatly increasing the weight, volume or expense of the electrical system. This invention is particularly useful in modern aircraft for supplying power to the various three-phase loads, such as electrical motors used in such aircraft.

Formerly, aircraft were provided with a single-phase voltage source and it was the practice to convert this voltage to a three-phase voltage supply to operate the various three-phase loads used therein. A circuit for converting a single-phase voltage source to a three-phase voltage supply is described in Patent No. 2,593,987 issued April 22, 1952, to Courtney and Lemmerman. In recent years, aircraft have been provided with three-phase source voltage so that it is no longer necessary to convert to three-phase for driving various motors. However, a new problem has arisen in that the source voltage is generally of a higher potential than the design requirements of standard three-phase motors. Therefore, it has become necessary to convert the entire three-phase voltage source to a lower potential. At first, it was thought necessary to provide three separate transformers to step down the potential of each phase of the source voltage. Later, it was discovered that the same results could be obtained with two transformers by stepping down two of the line-to-line phase voltages and connecting the secondaries in a conventional open delta connection. The same results can be obtained with two transformers of a one-to-one ratio connected across two of the phase lines and the grounded neutral. However, it is necessary to properly connect the secondaries of such transformers to provide the proper phase relation to obtain the conventional open delta connection. With the above methods in addition to the complexity of the circuit involved, there is a substantial addition to the weight, volume, and expense of the electrical system. Also, due to the complexity of the above circuits the reliability of the electrical system is decreased.

Therefore, one of the objects of this invention is to provide new and improved means of converting a three-phase source of electric power to a three-phase voltage supply of lower potential.

It is a further object of this invention to provide a simple means of converting such electrical power with less weight, volume, and expense than can be provided by presently used means and to increase the overall reliability of electrical systems requiring such conversion.

In carrying out the invention in one form, one end of a single-wound, center-tapped transformer is connected to one phase of the source voltage while the center tap of the transformer is connected to the grounded neutral. The desired three-phase potential is provided by connections to the center tap, the other end of the transformer and either one of the other two phases of the source voltage. In another form of the invention, a center-tapped winding of a transformer is connected as described above.

The invention will be better understood from the following description taken in connection with the accompanying drawings wherein:

Figure 1 is a block diagram of an electrical system using the invention;

Figure 2 is a schematic diagram showing the circuit of the invention applied to a three-phase motor with delta connected windings;

Figure 3 is a schematic diagram showing the circuit of the invention applied to a three-phase motor with Y-connected windings;

Figure 4 is a schematic diagram of a known supply circuit showing a transformer connected across one phase of the source voltage in a manner well known in the art to supply various single-phase voltage to other equipment;

Figure 5 is a schematic diagram illustrating the invention as applied to the supply circuit shown in Figure 4, using a transformer modified according to the invention.

Although the invention will be described as applied to a three-phase, 115/200 volt aircraft electrical system, it is to be understood that it can be applied to any three-phase electrical system to provide a three-phase voltage supply of lower potential, the potential being substantially equal to the line-to-line voltage of the source divided by the square root of 3.

Referring to the drawings wherein like numerals are used to indicate like parts throughout and with particular reference to Figure 1, there is shown a block 10 representing a standard three-phase source of electrical power commonly referred to as a three-phase, 115/200 volt, Y-connected, grounded neutral system such as is found on many present-day aircraft. A transformer 12 is shown connected to one phase—in this case—$\phi$A—of the source voltage and to the grounded neutral by wire 14 to provide, in conjunction with $\phi$B, a three-phase, 115 volt, line-to-line voltage supply for a load represented by block 16. The transformer used, according to one form of the present invention, is a single-winding transformer 12 shown in Figures 2 and 3 having a center tap 12a therein. Of course, it will be understood that the halves of the transformer 12 are inductively coupled, to provide transformer action between such halves, although schematically shown as a single straight winding for clarity of illustration. As shown in Figures 2 and 3, one end 12b of transformer 12 is connected to $\phi$A while the center tap 12a is connected to grounded neutral by wire 14.

Since the line-to-line voltage of source 10 between each of phases A, B, and C is approximately 200 volts, the voltage between any one phase and grounded neutral is 200 volts divided by the square root of 3, or approximately 115 volts. Thus, the voltage appearing across the half of transformer 12 which is connected to $\phi$A and the grounded neutral is substantially 115 volts. This voltage is also induced in the other half of transformer 12 between 12a and 12c. However, because transformer 12 is a single winding, the voltage induced across the lower half between 12a and 12c will be in the same direction as that appearing across the upper half between 12b and 12a. Therefore, it is obvious that, while the voltage in $\phi$A has been shifted 180° with reference to grounded neutral, its phase relation to $\phi$B and $\phi$C has not been changed. This is represented in Figures 2 and 3 by the dotted line labelled $\phi$A'.

Thus, approximately 115 volts is provided between 12a and 12c. Also, 115 volts is provided between line 14 and either $\phi$B or $\phi$C. Further, since the shift in voltage with reference to grounded neutral was made without shifting the phase relation to $\phi$B or $\phi$C, the voltage between 12c and φB or φC will also be 115 volts. This can readily be seen by an inspection of Figure 2. Without shifting φA with reference to grounded neutral, the voltage from φA to grounded neutral is 115 volts as is the voltage from φC to grounded neutral. However, the voltage from φA to φC is 200 volts. But with φA shifted with reference to grounded neutral as represented by φA', the voltage from φA' to grounded neutral is 115 volts as is the voltage from φB or φC to grounded neutral. Also, the voltage from φA' to either φB or φC is seen to be 115 volts. Thus, it has been shown that by use of the center-tapped transformer 12 there is provided a three-phase, 115 volt, line-to-line voltage supply from a three-phase, 115/200 volt, Y-connected, grounded neutral source.

Figure 2 shows the invention applied to 115/200 volt source to provide three-phase, 115 volt, line-to-line voltage supply to drive a three-phase load, represented as a motor having delta connected windings. As can be seen from Figure 2, line 14 from the center tap 12a of the transformer 12 is connected to one terminal 18 of the motor. End 12c is connected by line 20 to another terminal 22 of the motor and φB is connected by line 24 to terminal 26 of the motor. In Figure 3 a similar connection is shown to a three-phase motor having Y-connected windings with terminals 18', 22', and 26'. It is to be noted that, regardless of the type of load to which the invention is to be applied, the connection of the transformer 12 remains the same.

Figure 4 shows a portion of a conventional aircraft supply circuit including a transformer 28 having its primary 30 connected across a single phase φA and grounded neutral of a three-phase, 115/200 volt, grounded neutral power supply 10. The transformer 28 is provided with secondary windings 32, 34, and 36 which are used to provide single-phase voltage to many of the electrical components of an aircraft, as, for example, plate and filament voltages to radio receivers and transmitters.

The invention described herein can advantageously be applied to the aircraft supply circuit described above. In Figure 5 there is shown one such application of the present invention in which a transformer 38 having a center-tapped winding 40, the halves being inductively coupled, is used in place of transformer 28 of Figure 4. One-half of the winding 40 of transformer 38 is connected across φA and grounded neutral in the same manner as is the primary of transformer 28. Secondary windings 32, 34, and 36 are provided to supply single-phase voltage to other electrical components, as required.

However, the other half of the winding 40 is used to provide a three-phase, 115 volt, line-to-line voltage supply in the same manner as previously explained with reference to Figures 2 and 3. That is, approximately 115 volts are impressed across the upper half of the winding 40, between end 40b and center tap 40a. The same voltage is induced in the lower half of the winding, between 40a and 40c. The required three-phase, 115 volt, line-to-line voltage supply is then provided between the lines 42, connected to φB, 44, connected to winding center tap 40a, and 46, connected to end 40c of winding 40.

Of course, it is obvious that any three-phase load, represented by block 48, could be connected to lines 42, 44, and 46, as for example, the delta wound motor shown in Figure 2 or the Y wound motor of Figure 3.

While there has been described the preferred embodiments of the invention, it will be obvious to those skilled in the art that various changes or substitutions may be made without departing from the spirit or scope of the invention defined in the appended claims.

What is claimed as new and which is desired to secure by Letters Patent is:

1. A circuit for converting a three-phase, Y-connected, grounded neutral voltage source to a three-phase voltage supply having a lower line-to-line voltage than said source comprising a transformer having a center-tapped winding, the halves of said winding being inductively coupled, means connecting one end of said center-tapped winding to one phase line of said source, means connecting the center-tap of said winding to the grounded neutral of said voltage source and three-phase potential means connected to said center tap of said winding, to the other end of said winding and to one of the other two phase lines of said source, whereby a three-phase, line-to-line voltage supply is provided by said three-phase potential means which has a potential equal to the line-to-line potential of said source divided by the square root of 3.

2. A circuit for converting a three-phase, Y-connected, grounded neutral voltage source to a load which requires a three-phase voltage supply of a lower potential than said source comprising a transformer having a center-tapped winding, the halves of said winding being inductively coupled, means connecting one end of said winding to one phase line of said source, means connecting the center tap of said winding to the grounded neutral of said voltage source, the desired three-phase voltage supply of lower potential being supplied to said load by means connecting the other end of said winding to one terminal on said load, means connecting said center tap of said winding to a second terminal on said load, and means connecting one of the other two phase lines of said source to a third terminal on said load.

3. A circuit for converting a three-phase, Y-connected, grounded neutral power source to a three-phase voltage supply of lower potential than said source comprising a single winding, center-tapped transformer, the halves of said winding being inductively coupled, means connecting one end of said transformer to one phase line of said source, means connecting the center tap of said transformer to the grounded neutral of said source, a three-phase potential means providing connections to the other end of said transformer, to the center tap of said transformer, and to one of the other two phase lines of said source, whereby a lower potential, three-phase voltage supply is provided by said three-phase potential means.

4. A circuit for converting a three-phase Y-connected, grounded neutral voltage source to a three-phase voltage supply having a lower line to line voltage than said source comprising a single winding center tapped transformer, the halves of said transformer being inductively coupled, means connecting one end of said transformer to one phase line of said source, means connecting the center tap of said transformer to the grounded neutral of said source, the desired three-phase voltage supply of lower potential than said source being obtained between a first wire connected to said center tap of said transformer, a second wire connected to the other end of said transformer and a third wire connected to either one of the other two phase lines of said source.

5. A circuit for converting a three-phase Y-connected, grounded neutral voltage source to a three-phase voltage supply having a lower line to line voltage comprising a transformer having a center tapped winding, the halves of said winding being inductively coupled, means connecting one end of said center tap winding to one phase line of said source, means connecting the center tap of said winding to the grounded neutral of said source, and means forming the desired three-phase voltage supply having a lower line to line voltage, said means including one connection to the center tap of said winding, a second connection to the other end of said winding and a third connection to one of the other two phase lines of said source, said connections providing therebetween the desired three-phase line to line voltage supply.

No references cited.